US007097095B2

(12) United States Patent
Conard et al.

(10) Patent No.: US 7,097,095 B2
(45) Date of Patent: Aug. 29, 2006

(54) MODULAR MAIL PREPARATION SYSTEM

(75) Inventors: Walter S. Conard, Lake Villa, IL (US); David Schwaba, Chicago, IL (US); Richard Wojdyla, Wadsworth, IL (US)

(73) Assignee: Bowe Bell + Howell Postal Systems Company, Wheeling, IL (US)

( * ) Notice: Subject to any disclaimer, the term of this patent is extended or adjusted under 35 U.S.C. 154(b) by 0 days.

(21) Appl. No.: 11/053,002

(22) Filed: Feb. 7, 2005

(65) Prior Publication Data

US 2005/0189409 A1 Sep. 1, 2005

Related U.S. Application Data

(60) Provisional application No. 60/542,920, filed on Feb. 9, 2004.

(51) Int. Cl.
*G06F 17/00* (2006.01)

(52) U.S. Cl. .................................................... 235/375

(58) Field of Classification Search ................ 235/375; 347/4

See application file for complete search history.

(56) References Cited

U.S. PATENT DOCUMENTS 4,127,194 A * 11/1978 Erikson ...................... 209/578
4,340,314 A * 7/1982 Berger ........................ 400/625
5,377,120 A * 12/1994 Humes et al. ............. 700/224
5,403,398 A * 4/1995 Riess et al. ................. 118/681
5,459,670 A * 10/1995 Johnson et al. ............. 700/224
5,650,934 A * 7/1997 Manduley ................... 700/215
5,770,841 A * 6/1998 Moed et al. ................ 235/375
5,880,747 A * 3/1999 Bartenwerfer et al. .......... 347/4
6,303,889 B1 * 10/2001 Hayduchok et al. ......... 209/584
6,371,476 B1 * 4/2002 Isogai et al. ............... 271/3.14
2004/0013454 A1 * 1/2004 Manduley .................... 400/61

* cited by examiner

*Primary Examiner*—Thien M. Le
*Assistant Examiner*—Kristy A. Haupt
(74) *Attorney, Agent, or Firm*—McDermott Will & Emery LLP

(57) ABSTRACT

A mail preparation system for processing a mail piece comprises a magazine section to hold the mail piece and a feeder for feeding the mail piece into a transport path in a vertical position. Mail processing equipment may be placed along the transport path for processing the mail piece.

22 Claims, 3 Drawing Sheets

Figure 2 (100)

MODULAR MAIL PREPARATION SYSTEM

CROSS-REFERENCE TO RELATED APPLICATION

The present application claims the benefit of U.S. Provisional Application Ser. No. 60/542,920 filed Feb. 9, 2004, the disclosure of which is entirely incorporated herein by reference.

TECHNICAL FIELD

The present subject matter relates to a mail preparation system for preparing mail pieces. More specifically, the system provides for in-line printing of mail pieces, in-line application of permit indicia marks, as well as verification of print quality, verification to postal requirements and sorting of the mail pieces.

BACKGROUND

Current address printing systems are primarily used by direct mail processors ("direct mailers") to print addresses or other information on mail pieces. Such systems feed mail pieces through the system in a flat or horizontal position, i.e., the front of the envelope is facing upward. In order to print on the mail piece, printers are also placed in a horizontal position, i.e., with the print head facing downward or upward.

Such horizontal-feed address print systems have several limitations. For example, they are slow: they can process only approximately 18,000–22,000 mail pieces per hour. In addition, because the mail pieces are fed in a horizontal position, these systems cannot be combined or used with conventional mail processing or sorting systems, which feed and process mail pieces. Further, mail pieces are fed from a stack of mail pieces which are stacked one on top of each other, with the bottom mail piece being taken from the stack and fed into the system. If the feed stack is too high, there is too much weight on the bottom mail piece and it will not be fed properly. As a result, the stacks must be kept relatively small (about 12 to 18 inches in height) and must be replenished frequently by an operator to keep the system running. Also, there is a height constraint on how high the stack can be, i.e., the top of the stack can only be as high as an operator's shoulder height, otherwise it will be difficult or impractical for the operator to replenish the stack. Accordingly, 2–3 operators are usually required to keep such systems operating at their most efficient levels.

Also, because current address printing systems cannot be combined with conventional mail processing or sorting systems, verification or sort functions are not efficiently performed on the mail pieces after they are printed. Accordingly, extra processing steps are required when using current horizontal feed type printing systems because the printed pieces must be brought to a conventional processing or sorting system which can then verify and sort the mail pieces or perform additional operations needed that meet mail preparation requirements of the postal service.

A need exists, therefore, for a system that can print addresses or other information on vertically fed or processed mail pieces and that can verify qualities of the mail pieces. Additionally, there is a need for a system that can reduce the steps needed in printing, verifying and then sorting mail pieces and that can print mail pieces at faster speeds. A need also exists for a system that can reclassify mail from non-machineable to machineable mail and that can perform several system functions in-line, e.g., printing, verifying printed material, verifying postal requirements, sorting/tagging and sweeping into postal trays.

SUMMARY

The present subject matter relates to a modular mail preparation system with in-line address print capability as well as verification and sorting capabilities.

An objective is to help mail piece processors, such as direct mailers, increase production and reduce labor requirements.

Another objective is to provide a high-speed, vertical transport system that can print information on mail pieces while the mail pieces are in a vertical position.

Another objective is to provide multiple print stations with variable height that enable printing.

It is still another objective to provide in-line, duplex printing on mail pieces for printing on the back side of a mail piece.

It is yet another objective to eliminate the requirement to affix postage indicia, i.e., postage metering and pre-cancelled stamps, to mail pieces using mailing based payment methods such as a permit system.

A related objective is to provide a means to apply permit indicia marks to mail pieces with direct printing on the envelopes or labels and through the application of labels with permit indicia marks imprinted on them.

It is a further objective to provide a system that can print full addresses on mail pieces, as well as verify, sort, tag and sweep the mail pieces into postal trays at rates of about 36,000–50,000 pieces per hour. The modularity allows the machine to be configured to print, weight, verify, prepare mailing reports, lab, measure mail piece physical parameter, certify quality according to postal service rules, mail piece edge markers, or perform various of these functions in any desired combination.

Another objective is to provide a modular mail preparation system in which mail pieces can be printed, verified and sorted into bins.

It is still further an objective to provide a system that can perform custom printing of addresses (or other information) as well as perform verification and sorting functions on mail pieces.

Systems disclosed herein for preparing, sorting and certifying a mailing can include a vertical feed magazine to feed mail pieces onto a vertical transport, a controller and one or more processing modules located along the transport path. The modularity of the system allows combining various modules, as needed, to fulfill the requirements of various different mail processing operations. Examples of the modules include various printers, one or more verifiers, an in-line scale, one or more markers, diverters, sorters, stackers, bins and the like, all typically under common program control by the controller so as to provide a desired overall processing of a stream of mail pieces.

Additional objects, advantages and novel features of the examples will be set forth in part in the description which follows, and in part will become apparent to those skilled in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
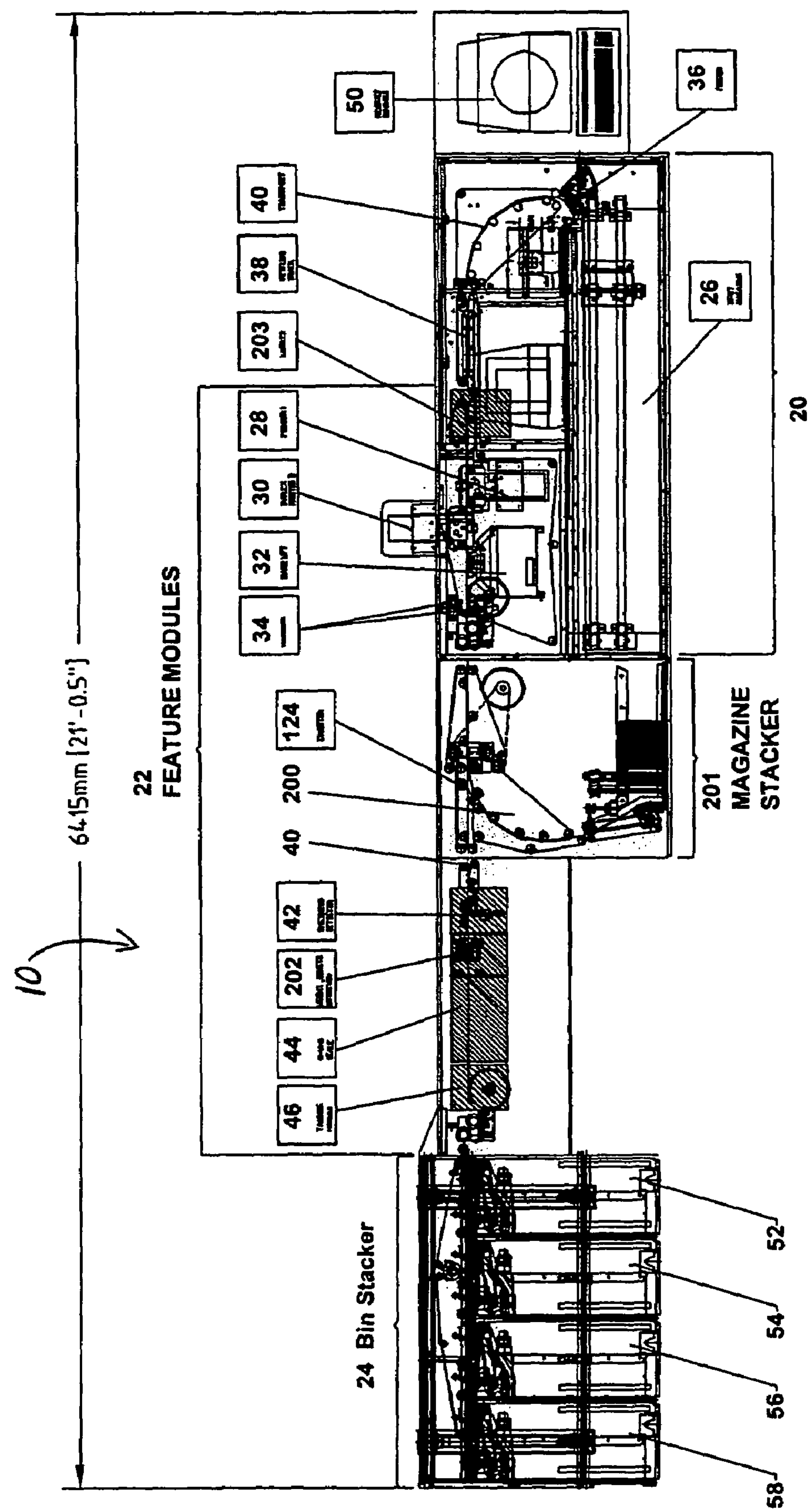
FIG. 1 illustrates a top view of one example of a modular mail preparation system according to the present teachings.

Referring now to FIG. 1, a modular mail preparation system 10 is shown. As shown, the system 10 has a front end 20, various feature or processing modules (as will be described below) located downstream from the front end 20, and a stacker bin 24 located downstream of the processing modules. In many ways the front end 20 is similar to the front end of an existing mail sorting system such as the Bell+Howell Criterion™ sorting system.

As shown, front end 20 has an input magazine 26, a feeder 36 and settling track 38. The magazine 26 can hold mail pieces in a vertical or upright position to be fed into and processed by the system 10. As also shown, the magazine section 26 is approximately 75 inches long, however, as will be apparent to one of ordinary skill in the art, the magazine 26, may be longer or shorter. The magazine section 26, like the rest of the system 10, has a series of movable belts, some of which are indicated as reference numeral 40 (See FIGS. 1, 2 and 3), which form a transport path and which transport the mail pieces in a generally vertical or upright position through the system 10 along a desired path. Mail pieces are fed into the transport path 40 of the system 10 from the magazine 26 by a feeder 36 at speeds of approximately 36,000–50,000 mail pieces per hour. The front end 20, also has a settling section 38 which allows the mail pieces to settle into proper position and ensure consistent positioning of the printing areas before reaching the other various processing modules 22 of the system 10 where they are further processed.

One of the processing modules can be a linerless label applicator 203 which can apply variable height labels to variable positions on the front of the mail piece. The labels provide a clear zone for printing of barcodes or address data when the known interference exists. A linerless label applicator can be used to apply permit indicia mark labels to mail pieces. The labels can be pre-printed or custom printed just before application. Turn over modules may be required to register the top of the mail piece for labeling, if variable height mail pieces are being processed.

Other processing modules can include printers 28 and 30 which can print various information on the mail pieces. The printers 28 and 30 are located adjacent the transport path so that when the mail pieces pass by the printers 28 and 30 they are close enough to the print head to be printed.

The first printer 28 is positioned to print information on a first or front side of the mail piece and the second printer 30 is positioned to print information on a second or back side of the mail piece. The information that can be printed on the mail pieces by the printers 28 and 30 includes: full address information, bar code information, postage payment information, marketing information, or other information. Additional printers (not shown) may be added along the transport path to print additional information, for example on different locations, on the mail piece as well.

An additional printer may be added at location 28 to print permit indicia marks directly on to the mail piece. If the mail is not all at a uniform height, a turn over module will be added to invert the mail piece so that the top is registered correctly to ensure that the permit indicia mark is printed in the upper right corner of the mail piece. An additional inverter module would be used to turn the mail piece right side up for continued processing.

The printers 28 and 30 can be high speed, duplex, ink-jet printers, such as a Videojet Printro printer manufactured by Videojet Technologies, Inc. This printer has a print head large enough to print full address information on mail pieces and is fast enough to print on the mail pieces as they travel along the transport path at speeds up to approximately 36,000 to 50,000 pieces per hour. The print head can be equipped with single or dual printhead configurations having 1 inch or 2 inch printhead arrays. Other types of printers may also be used, such as a Scitex printer.

The printers 28 and 30 can be adjustably mounted on the front end 20 so that the vertical height at which ink from the print head hits the mail pieces can be adjusted. The printers 28 and 30 can also be installed on a slidable mount to the front end 10 by a bracket so that the printers can slide away from the transport path, which facilitates ease of maintenance and cleanup of the printers 28 and 30.

Another processing module can be an image lift system 32 which can lift an image of the front side of the mail piece to verify material and read any address data, planet code, POSTNET code, postage indicia, endorsement line, key line, 2D or linear barcode or other printed or pre-printed information. Image analysis also can be used to determine the height and length of the mail piece or sensor arrays can be used as an alternative.

Another processing module can be a marking device 34, such as small, e.g., ⅜ inch, ink rollers, which can place marks on selected mail piece as desired, for example to indicate a change in zip code to facilitate handling of the mail pieces. The current art uses up to three markers to allow different colors to be used to indicate variable marking reasons such as zip break or reject piece. The markers may place a selected color (e.g., one of three possible colors) on the mail pieces.

The system 10 can have an additional mail piece processing module in the form of a magazine or reject stacker 201. A diverter 124 and can be used to route mail pieces through a transport 200 to the reject stacker 201. Mail pieces that have been diverted to the reject stacker 201 can be stacked in the vertical position, just like the feeder 112. Any defective mail pieces that have been sent to the reject stacker 201 can easily be moved back to the feeder 112 to be reprocessed by the system 10. Mail pieces not diverted are routed to the additional modules shown for additional processing.

Other possible processing modules that can be included in the system 10 are a thickness detector 42, height and length detectors 202, an in-line scale 44 and a tabbing module 46.

The selection and order of the processing modules or equipment is optional and the different modules or equipment pieces can be added in any combination or order as a desired. As the mail pieces travel along the transport path and past each of the modules, the mail piece is processed accordingly. The front end and all of the processing equipment or modules, i.e., labeler 203, printers 28 and 30, image lift system 32, marker 34, reject stacker 201, thickness detector 42, height and length detectors 202, in-line scale 44 and tabbing module 46, can be controlled by one or more controllers 50 or computer based programs which are commonly used on mail processing equipment.

As shown, the system 10 also has a stacker bin 24 positioned downstream from the tabbing module 46. As shown, the stacker bin 24 has four bins 52, 54, 56 and 58 into which the mail pieces can be sorted according to any number of known sorting techniques. The bins 52, 54, 56 and 58 are also controlled by a controller or computer based program which activates means such as a diverter, like the diverter 124, which is associated with each bin 52, 54, 56 and 58 to direct or divert the mail piece out of the transport path and into a reject bin 52 or one of the other bins 54, 56 and 58. The bins 52, 54, 56 and 58, may be fixed bins, may have removable bin pockets or may slide out and/or be modularly expandable bins. As will be apparent to one of ordinary skill in the art, a greater or lesser number of bins may be provided in the stacker bin 24. Depending on information read and verified by the image lift system 32, as is known in the art, each mail piece is directed to an appropriate bin 52, 54, 56 or 58. When the image lift system 32 is not used, each mail piece can be directed to an appropriate bin 52, 54, 56 or 58 based on break data from the printer control system 50 used to print the addresses in a predetermined order, e.g., according to postal regulations.

Figure 2:
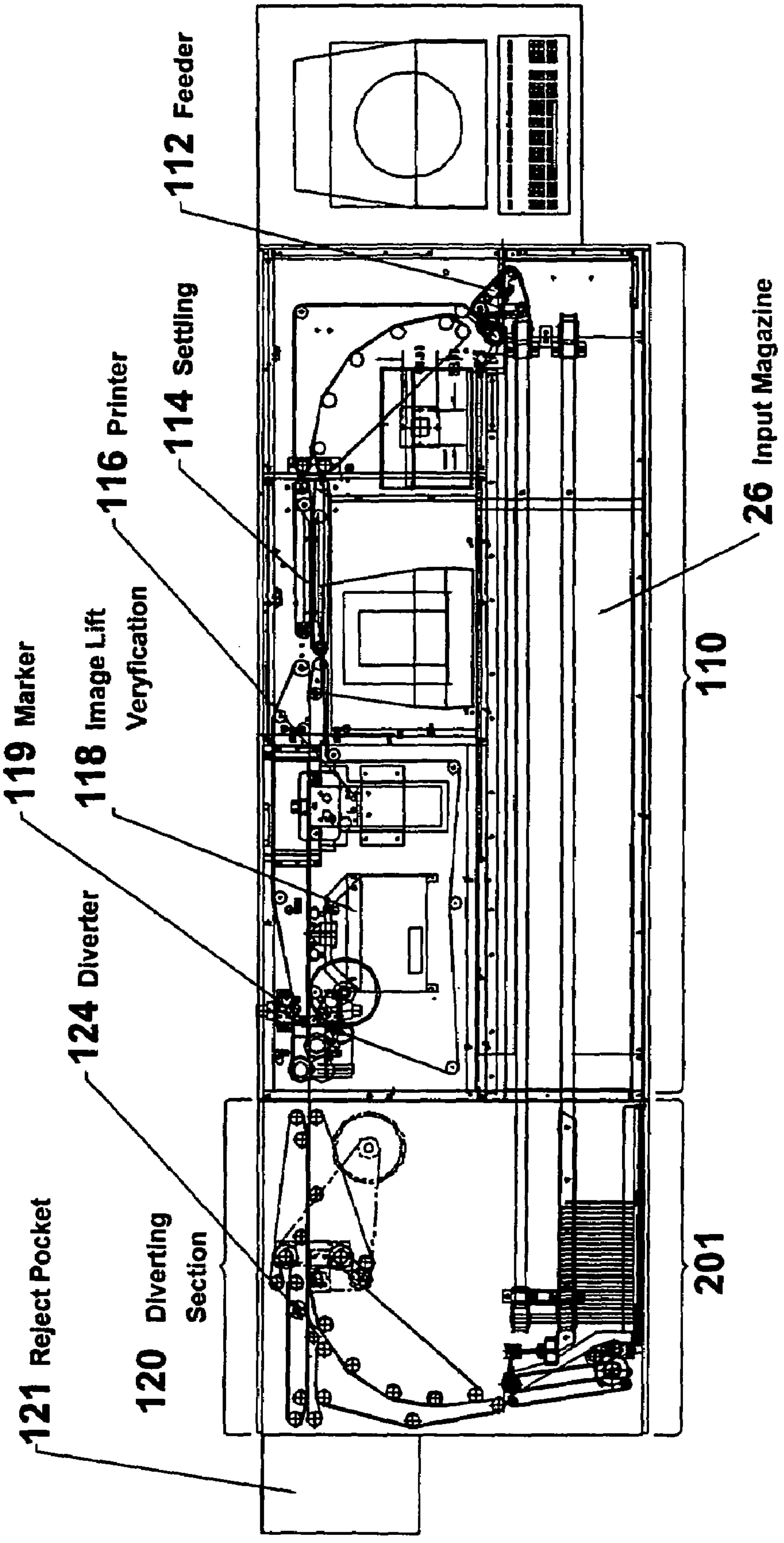
FIG. 2 illustrates a top view of two sections of another example of a modular mail preparation system according to the present teachings which includes an integrated feeder/stacker magazine.
Figure 3:
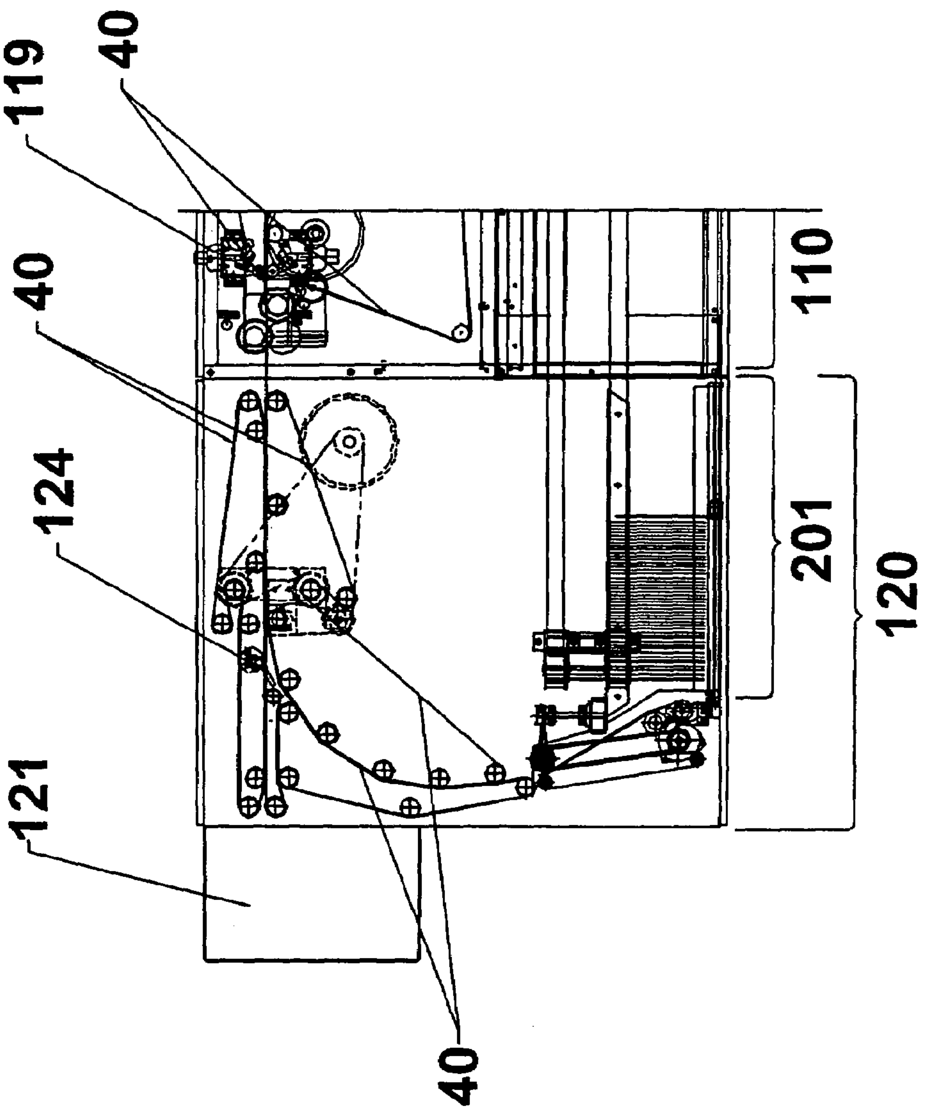
FIG. 3 illustrates a close-up view of one of a turn transport with a reject diverter and integrated feeder/stacker magazine of the system shown in FIG. 2.

Another example or configuration of a modular mail preparation system 100 is shown in FIGS. 2 and 3. As shown in FIGS. 2 and 3 the system 100 has a front end 20 similar to the front end 20 shown in FIG. 1. The front end 20 has a feeder 112 and a settling section 114. Processing modules on the system can include a printer 116, an image lift module 118 and markers 119. Downstream from the markers 119 is a diverting section 120 which can be used to route mail pieces to a reject pocket 121 or to a magazine stacker 201. Mail pieces that have been diverted to the magazine stacker 201 can be stacked in the vertical position, just like in the input magazine 26. The magazine 26 and the stacker section 201 can be used as a combined contiguous magazine with a variable amount of mail allocated to feeder input or output stacked mail.

In operation, for example, if a mail piece is determined to be defective for any reason by the verifier 118, e.g., the bar code is unreadable or defective, control logic causes the mail piece to be directed, by means of a diverter 124 (See FIG. 3), to the reject pocket 121. Mail pieces that are determined to be valid, are routed to the magazine stacker 201 for operator traying according to the tray breaks marks applied by the marker 119.

Exemplary Method of Operation

Using the modular mail preparation system described in FIGS. 1, 2, and 3 above, a method for processing mail pieces may include the steps of: a) feeding a mail piece into the transport path; b) printing address information on the front side of a mail piece; c) printing other information or indicia on the front and/or back side of the mail piece; d) verifying the address and/or other information or indicia on the mail piece; e) marking the mail piece with a mark(s); f) detecting the thickness of the mail piece; g) weighing the mail piece; h) tabbing mail piece; i) if the mail piece is defective, routing the mail pieces to a reject pocket; and j) if the mail piece is not defective, i.e., it is valid, sending the mail piece to be sorted into a bin. Of course other combinations of these steps, as well as additional or fewer steps, can also be used to process mail pieces as desired.

In operation, the following operations can be performed by such a system:

1) Mail pieces are fed into the system;

2) Mail pieces travel through the settling section;

3) Mail pieces are labelled;

4) Mail pieces are printed on the front and/or back. The following are examples of the types of information that can be printed on a mail piece: address, PLANET code, POSTNET barcode, mail permit, indicia, address forwarding data, advertisements, vanity data, endorsement line, key line, any 2 dimensional bar code, bundle break labels.

5) Mail pieces are verified by an optical character reader (OCR), pattern recognition system or barcode reader to verify the printed information or data is accurate and/or readable and in accordance with USPS mail acceptance rules. In addition, the OCR or barcode reader control system can store the data it reads to accomplish adaptive presort analysis.

In addition, the OCR can process the data it reads to accomplish adaptive presort analysis and presort certification to postal regulations without tray break information. Adaptive presort analysis requires that the mail pieces are being printed in Presort Accuracy Validation Evaluation (PAVE) presort order and all 3 or 5 digit trays and Automated Area Distribution Center (AADC) trays are presented to the machine in a group. Each time the image system detects a change in the 3 or 5 digit zipcode value, the data is flagged to determine if the change represents a legitimate switch to a new zipcode grouping or is simply a mail piece or pieces that are out of order. Out of order pieces would be indicated if previous 3 or 5 digit grouping reoccurred with in the next few pieces in the mailing. The out of order pieces may be sent to the reject bin.

6) The mail pieces can be marked for piece identification. For example, they can be marked to indicate a break. A break mark can be used to indicate a customer break, tray break, zip code break or mail carrier bundle break. Other breaks may also be desired.

7) Mail pieces can be tabbed for better automation process in the postal network.

8) Mail pieces can be restacked. For example, all mail pieces may be routed back the input magazine 120 or only rejected mail pieces can be routed to the input magazine, which then functions as a reject bin.

9) Mail pieces can be routed to sort bins. Sorting of mail pieces into bins and/or pockets can help guarantee presort traying accuracy. The system can provide bin full/overflow to next bin features and tray and/or zip code breaks. When the zip break control is sent to the bins from the system controller, the mail piece transport tracking system will ensure that the next piece is routed to the next available bin (New bin selection based on zip break). Zip break is generally defined as any specified break point that identifies a desired grouping of mail pieces according to operator specifications or postal service requirements.

10) Mail pieces can be routed to sort bins. If the mail is not presented to the system in PAVE order or addresses are not printed in PAVE order, a plethora of sort bins are used to perform the required sorting operation to achieve postal authority presort requirements. The sorting process is controlled by using address or barcode data read from the mail piece by an OCR or barcode reader and sorting the mail pieces into presort order.

11) An alternate sorting control is used for putting multiple groups of mail, such as carrier bundles, into the same bin using the markers 34. When the system controller determines that many small mail groups are to be printed or the OCR or barcode reader determines that many small groups are detected the system controller will control the markers to mark the first and/or last piece of each group and place them in the same bin. When the printer is used the mail piece count per bundle is known in advance. This data along with mail piece thickness 42 measurements or known thickness is used to ensure that no bundle will overflow from one bin to another. If the bin is projected to overflow then the bundle/group of mail will be routed to the next available bin.

12) Mail pieces can be weighed. In-line weighing of mail pieces can be used to determine a merged weight for the mailing. By weighing each mail piece and determining a rate classification for each mail piece based on its weight, a "merged mailing" can be ascertained and a corresponding postage amount assigned to the mailing. Accordingly, the permit mailing methods can be used for all mailings, eliminating the need to affix weight based postage to the mail pieces.

13) The mailing (all mail pieces together) can be certified. Data about the mailing can be captured, generated, encrypted and provided to the USPS to certify that the mailing has been prepared in accordance with postal regulations. The data can be provided by a paper report or by an encrypted electronic report sent directly to the USPS or via the internet.

14) Tray label printers can be provided as well to print labels for trays when mail pieces are to be moved from a bin to a tray to accurately identify the mail in the tray.

Using the modules and equipment described above, several configurations and control functions can be achieved. Several configurations and functions are described below. It should be understood that as described herein, one or more controllers can be used for controlling different pieces of equipment in the system coupled to a controller.

Exemplary Modular Configurations

Six configurations of the Modular Mail Preparation System, using various combinations of modules and/or processing routines, are presented in this description. These configurations are not construed to define all possible configurations or combinations of modules that can be used to meet different mail processing requirements. For example, the technology described in configuration five associated with report generation is applicable to all configurations, if desired to meet a particular requirement.

In one configuration of a mail preparation system, the system can include a vertical feed magazine to feed mail pieces onto a vertical transport; a printer, positioned along transport path, for printing on mail pieces; sort bins, downstream of the printer; a controller, coupled to the printer and sort bins. The controller tracks mail pieces through the system, controls printing of information onto mail pieces and directs sorting of the mail pieces into bins based on predetermined criteria or data stored in controller. The predetermined criteria or data used to control the sorting may be associated with a print list stored in the controller.

The information that is printed by the printer can include, for example, address information, zip code, bar code, postage permit, date, encoded date, advertisement, indicia, etc.

The information printed onto a mail piece can be customized for each mail piece based on information stored in controller about each mail piece. The information that is stored by the controller and used to custom print on each mail piece can be addressee information, zip code information, bar code information, weight of a mail piece, key line information, endorsement line information, or a sequence number.

Permit indicia that are printed on mail pieces by this equipment may have various content depending on the Postal Authority regulations where the mail in processed. For example, in the case of the USPS, the data must include identification of the mailer, a 5 digit ZIPCODE for the processing center of origin or the city and state, and class of postage for the presort and delivery service requested. In addition, the date of mailing, amount of postage paid, weight of the piece and rate markings may be printed. Permit indicia generally refer to any postage indicia identifier except for meter marks and stamps.

Criteria used to control sorting of the mail pieces into bins may include, for example, (a) addressee information, zip code or bar code information associated with each mail piece, (b) total number of pieces that have been placed in a bin, (c) a signal from a bin full sensor or (d) other operator specified parameters.

The system may include a second printer to print information on mail piece. The second printer may print on the same side of the mail piece as the first printer or on the opposite side. Information printed by the second printer can be customized for each mail piece based on information stored in the controller (or in an associated memory) and can include various data, such as: address information, zip code, bar code, postage permits, date, encoded date, advertisement, etc.

The system may include a label applicator that can apply labels, blank or pre-printed, to the mail piece. In addition, the second printer can print on the label. Examples of labelers and label printers can be found in U.S. Ser. No. 10/745,157 filed Dec. 23, 2003, Ser. No. 10/884,214 filed Jul. 2, 2004, and U.S. Pat. No. 5,922,169 issued Nov. 19, 1996, the entire contents of which are hereby incorporated by reference.

Printing can be variable height. For example printers with 2 inch print heads can be used to print up to 2 inches of information. Other sized print heads can be used. Printing speed is fast enough to handle approximately 36,000–50,000 mail pieces per hour.

The number of sort bins in the bin stacker can be expandable. Multiple levels of bins may also be provided. Additionally, one or two sided bin configurations may be used. Examples of such bin configurations can be found in U.S. Ser. No. 10/463,310 filed Jun. 17, 2003, the entire contents of which is hereby incorporated by reference.

A verifier can be added and used to verify information printed on each mail piece. If the verifier determines a mail piece is defective, it can send the mail piece to a predetermined bin designated for rejected mail pieces, rather than to the bin it would have been sorted to if it were not defective. Other processing modules described above can be added to this system as well.

The system can also generate a report based upon information stored in the controller about the mail pieces processed. The report can include the number of pieces per zip code, number of pieces by weight, the amount of discount for the mailing based on number of 5-digit zip code bundles, 3-digit zip code bundles, partial trays and the total amount of postage due for the mailing or any other data stored about the mail pieces by the controller. For permit mailings, the Postal Authority accepting the mail determines the exact content and format of the report in order for the report to be used as a certification of the postage due for the mailing. The USPS, for example, publishes its reporting requirements in the Domestic Mail Manual (DMM).

In a second configuration, the mail preparation system can include a vertical feed magazine to feed mail pieces onto a vertical transport; a printer, positioned along the transport path, for printing on mail pieces; and a controller, coupled to the printer to control printing of information onto mail pieces. The transport path returns printed the mail piece to the vertical feed magazine after printing.

The vertical feed magazine can have different belt configurations that move the mail pieces along the magazine. For example, the magazine may have one belt which drives mail pieces that are to be fed into the system and the rejected mail pieces. Alternatively, the magazine may have two belts, one to feed mail pieces into the system, and a second belt for the mail pieces that have been rejected and returned to the magazine.

Information that is printed can include: address information, zip code, bar code, postage permit, date, encoded date, advertisement.

Information printed onto a mail piece can be customized for each mail piece based on information stored in controller about each mail piece. The information that is stored by the controller and used to custom print on each mail piece can be addressee information, zip code information or bar code information.

Printing can be variable height. For example printers with 2 inch print heads can be used. Other size print heads can also be used. Printing speed is fast enough to handle approximately 36,000–50,000 mail pieces per hour.

The system may include a marker, positioned along the transport path and coupled to the controller. Controller controls marking of certain mail pieces based on predetermined criteria. Exemplary criteria used to control marking of mail pieces includes: (a) addressee information, zip code or bar code information associated with each mail piece, (b) number of pieces that have been printer or (c) postal service sortation rules.

The system may also include an image verifier, along the transport path and coupled to the controller for reading information on the mail piece. The information can be preprinted information or information printer by the printer. A marker module marks a mail piece based on information determined by verifier, i.e., if the mail piece is defective. This defect marking can be performed by the first marker (above) or a second marker, which prints in a color different than the first marker.

The system can also include an image verifier, positioned along the transport path for reading information on the mail piece and a reject pocket and diverter, both coupled to the controller. If the image verifier determines mail piece is defective, the mail piece is diverted to reject pocket, otherwise, the mail piece is routed back to magazine.

The system can also include a second printer to print information on a mail piece. The second printer can print on the same side of the mail piece as the first printer or on the opposite side. Other processing modules can be added as well.

A kicker module can be added as well. The kicker module can be associated with the feeder magazine to physically push a mail piece. The kicker can then be controlled to push a rejected mail piece, a mail piece to indicate a zip code or other break. The kicker can also be controlled to push a single mail piece to mark a break, or push an entire group of pieces to indicate that all the pushed mail pieces are to be considered a group.

The system can also generate a report based upon information stored in the controller about the mail pieces processed. The report can include the number of pieces per zip code, the number of pieces by weight, the amount of discount for the mailing based on number of 5-digit zip code bundles, 3-digit zip code bundles, partial trays and the total amount of postage due for the mailing, postage due by client or any other data stored about the mail pieces by the controller that is needed for production management or postal service reporting. The Postal Authority accepting the mail determines the exact content and format of the report.

In a third configuration, the mail preparation system can include a vertical feed magazine to feed mail pieces onto a vertical transport; a printer, positioned along transport path, for printing on mail pieces; a verifier to verify information on mail piece; a diverter; and stacker bins. A controller is coupled to the printer, verifier, diverter and stacker bins. If the verifier determines that a mail piece is a reject, the controller activates the diverter to divert the mail piece to vertical feed magazine; otherwise, the system sends the mail piece to bin stacker sort bins.

Information read by a verifier can include any one or more of: address, bar code, zip code, postage, endorsement line, key line, etc. The verifier can read information, compare it to information stored in the controller (or other database) to determine whether to reject a mail piece or not.

If a piece is determined to be a rejected mail piece, the verifier can send a signal to the controller so the controller can build and store a reject file of all rejected mail pieces. The rejected mail pieces can be re-printed, re-worked or new mail pieces can be printed.

The system can have additional printers (with same functions described above).

The system can also have a label applicator to apply a label to a rejected mail piece to cover "defective" printing (so that mail piece can be re-fed and information can be re-printed on the label) or to cover a preprinted area to provide a clear zone for printing information such as the Postnet barcode.

The controller can be used to sort mail pieces into bins based on predetermined criteria stored in controller.

Criteria used to control sorting mail pieces into bins can include: (a) addressee information, zip code or bar code information associated with each mail piece (b) total number of pieces that have been placed in a bin or (c) weight measurement.

The number of sort bins can be expandable, multiple levels of bins, and double sided bins. The number of bins can be, for example, from 1 to 256 bins, or more.

A kicker module can be added as well. The kicker module can be associated with the feeder magazine to physically push a mail piece. The kicker than then be controlled to push a rejected mail piece, a mail piece to indicate a zip code or other break. The kicker can also be controlled to push a single mail piece to mark a break, or push an entire group of pieces to indicate that all the pushed mail pieces are to be considered a group. Other processing modules can be added as well.

The system can also generate a report based upon information stored in the controller about the mail pieces processed. The report can include the number of pieces per zip code, number of pieces by weight, the amount of discount for the mailing based on the number of 5-digit zip code bundles, 3-digit zip code bundles, partial trays and the total amount of postage due for the mailing or any other data stored about the mail pieces by the controller. The Postal Authority accepting the mail determines the exact content and format of the report.

In a fourth configuration, a mail preparation system can include a vertical feed magazine to feed mail pieces onto a vertical transport; a marker, positioned along the transport path, for marking on mail pieces; stacker bins or a reject pocket; and a controller, coupled to the marker. The controller activates the marking for marking a mail piece to indicate a break in carrier route, based upon predetermined criteria, e.g., zip code, street address, carrier routes, etc.

The controller can control sorting of the mail pieces as described above.

The system can include a printer to print information on mail pieces. Information can be customized for each mail piece based on information stored in controller about each mail piece, such as addressee information, zip code information, bar code information or permits.

The system can include a verifier. The verifier can read and verify accuracy of information on mail piece. Information analyzed by the verifier can include one or more of: address, bar code, zip code, postage, endorsement line, key line, etc.

The system can also include a scale to weigh mail pieces. Such a scale sends information to the controller, which stores weight information and controls the printer to print indicia, meter mark, permit based on weight of mail piece or weight information. Other processing modules can be added as well.

The system can also generate a report based upon information stored in the controller about the mail pieces processed. The report can include the number of pieces per zip code, the number of pieces by weight, the amount of discount for the mailing based on number of 5-digit zip code bundles, 3-digit zip code bundles, partial trays and the total amount of postage due for the mailing or any other data stored about the mail pieces by the controller. The Postal Authority accepting the mail determines the exact content and format of the report.

In a fifth configuration, a system for preparing, sorting and certifying a mailing can include a vertical feed magazine to feed mail pieces onto a vertical transport; a printer, positioned along the transport path, for printing information on mail pieces; and sort bins, downstream of the printer. A controller, coupled to the printer and sort bins, tracks mail pieces through the system and controls printing of information onto mail pieces. The controller also controls the sorting of the mail pieces into bins, based on predetermined criteria stored in controller. A report is generated, based upon information stored in the controller about the number of mail pieces processed at a given first weight and the number of pieces processed at a second given weight, for example, to generate a report for the mailing.

The report can include the number of pieces per zip code, the number of pieces by weight, the amount of discount for the mailing based on the number of 5-digit zip code bundles, 3-digit zip code bundles, partial trays and the total amount of postage due for the mailing. The Postal Authority accepting the mail determines the exact content and format of the report.

Verification equipment can be added to find reject mail pieces and process such pieces accordingly, e.g., to send reject mail pieces to a reject bin or to mark them with a marker. Other processing modules can be added as well.

In a sixth configuration, the system for preparing, sorting and certifying a mailing can include a vertical feed magazine to feed mail pieces onto a vertical transport; a printer, positioned along the transport path, for printing information on mail pieces; an in-line scale; sort bins, downstream of the printer; and a controller, coupled to the printer scale and sort bins. Here, the controller tracks mail pieces through the system and controls printing of information onto the mail pieces. The system weighs each mail piece, and the controller causes the system to sort mail pieces into bins based on predetermined criteria stored in controller. The controller also generates a report about the number of mail pieces processed at a given first weight and the number of pieces processed at a second given weight, so as to provide a report for the mailing.

The system can generate a report which has the number of pieces per zip code, the number of pieces by weight category, the amount of discount for the mailing based on the number of 5-digit zip code bundles, 3-digit zip code bundles, partial trays and the total amount of postage due for the mailing. The Postal Authority accepting the mail determines the exact content and format of the report.

The system can generate a report, which contains the same information as above but is segregated based on processing mail from multiple clients. These reports are used for client billing when multiple clients make up a mailing.

The system can generate a report, which contains the same information as above but gives differences between the weights and rates claimed by the mailer or clients versus the weights and resultant weights actually measured by the system.

A verifier can be added to find reject mail pieces and process those mail nieces accordingly, e.g. to send rejected mail pieces to a reject bin or to mark those mail pieces. Other processing modules can be added as well.

Of course other combinations of the modules can be assembled to create other configurations as well.

Many of the functions relating to the system 10 are implemented on a computer or computers serving as the controller, which of course may be connected for data communication via components of a network. The hardware of such computer platforms typically is general purpose in nature, albeit with an appropriate network connection for communication via a local area network, an intranet, the Internet and/or other data networks.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse, a trackball, etc. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network. The elements of such a general-purpose computer system also may be combined with or built into routing elements or nodes of the network.

The software functionalities (e.g., many of the operations described above) involve programming of controllers, including executable code as well as associated stored data. The software code is executable by the general-purpose computer that functions as the particular computer. In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable medium. Execution of such code by a processor of the computer platform enables the platform to implement the delivery point sorting system 10 or 100 functions, in essentially the manner performed in the embodiments discussed and illustrated herein.

As used herein, terms such as computer or machine readable medium refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s). Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the technology disclosed herein may be implemented in various forms and examples, and that they may be applied in numerous applications, only some of which have been described herein. It is intended by the following claims to claim any and all modifications and variations that fall within the true scope of the advantageous concepts disclosed herein.

We claim:

1. A mail preparation system, comprising:

a feed magazine and a vertical transport path;

a printer, positioned along the transport path, for printing information on the mail pieces;

the transport path being configured to return mail piece to feed magazine after printing;

a controller, coupled to the printer, the controller being configured to send signals to the printer to print information onto the mail piece; and a verifier, coupled to the controller; wherein:

said verifier is configured to check the information printed on the mail piece to determine if the information printed on the mail piece is acceptable, and to send a signal to the controller if the information is not acceptable, and the controller is configured to send the mail piece to the feed magazine if the information is acceptable.

2. A mail preparation system, comprising:

a feed magazine and a vertical transport path;

a printer, positioned along the transport path, for printing information on the mail pieces;

the transport path being configured to return a mail piece to the feed magazine after printing;

a controller, coupled to the printer, the controller being configured to send signals to the printer to print information onto the mail piece; and a verifier, coupled to the controller; wherein:

said verifier is configured to check the information printed on the mail piece to determine if the information printed on the mail piece is acceptable, and to send a signal to the controller if the information is not acceptable, and the controller is configured to send the mail piece to the feed magazine if the information is not acceptable.

3. A permit mail preparation system, comprising:

a magazine for holding and feeding mail pieces in a vertical position;

a transport path coupled to the magazine for receiving and horizontally transporting the mail pieces through the system in a vertical position;

an applicator located along the transport path, for applying a postal permit to each of a plurality of respective mail pieces as each of the respective mail pieces moves along the transport path while in a vertical position; and a controller having permit information stored therein, for sending signals to the applicator to control application of a postal permit to each of the respective mail pieces based upon the stored permit information, wherein the magazine, transport path and applicator are configured to allow the permit mail preparation system to process at least about 36,000 mail pieces per hour.

4. The permit mail preparation system of claim 3, wherein the applicator comprises a printer, positioned along transport path, for printing permit indicia directly to the respective mail pieces.

5. The permit mail preparation system of claim 3, wherein:

the applicator comprises a label applicator, coupled to the controller, and the label applicator is configured to receive signals from the controller directing the label applicator to apply a label containing a postal permit to each of the respective mail pieces as it travels along the transport path.

6. The permit mail preparation system of claim 5, wherein each label contains a pre-printed postal permit.

7. The permit mail preparation system of claim 6, further comprising a printer responsive to the controller for printing a postal permit on each label before the applicator applies each label to one of the respective mail pieces.

8. The permit mail preparation system of claim 3, wherein the controller generates a postal report for certification of permit mailing including at least the number of respective mail pieces on which a postal permit has been applied.

9. The permit mail preparation system of claim 8, further comprising:

a verifier positioned downstream of the applicator along the transport path, for verifying whether or not the postal permit applied to each of the respective mail pieces is acceptable and supplying verification data to the controller, wherein, in response to the verification data, the controller generates the postal report for certification of permit mailing so that the number of respective mail pieces indicates those on which an acceptable permit has been applied.

10. The permit mail preparation system of claim 8, further comprising:

an in-line scale located along the transport path, for weighing each of the respective mail pieces as the respective mail pieces move along the transport path while in a vertical position and sending data regarding measured weight of each of the respective mail pieces to the controller, wherein, in response to the data regarding measured weight of each of the respective mail pieces from the in-line scale, the controller includes in the report the number of the respective mail pieces processed of one or more measured weights.

11. The permit mail preparation system of claim 3, further comprising:

mail sorting equipment positioned to receive and sort mail pieces on which a postal permit has been applied, received from the mail transport path, wherein:

the controller is further for sending signals to the mail sorting equipment to sort the mail pieces based on address information, and the mail sorting equipment also is configured to process at least about 36,000 mail pieces per hour.

12. A system for preparing and certifying a permit mailing, comprising:

a magazine for holding and feeding mail pieces in a vertical position;

a transport path coupled to the magazine for receiving and horizontally transporting the mail pieces through the system in a vertical position;

an applicator located along the transport path, for applying a postal permit to each of a plurality of respective mail pieces as each of the respective mail pieces moves along the transport path while in a vertical position;

an in-line scale located along the transport path, for weighing each of the respective mail pieces as the respective mail pieces move along the transport path while in a vertical position; and a controller, coupled to the applicator and the in-line scale, for:

(a) sending signals to the applicator to control application of a postal permit to each of the respective mail pieces, (b) receiving information from the in-line scale about measured weight of each of the respective mail pieces, and (c) generating a postal report for a permit mailing, which includes certified data regarding:

(1) mail pieces on which a postal permit has been applied, and (2) information about number of mail pieces processed of one or more measured weights, based on the information from the in-line scale, wherein the magazine, transport path, applicator and in-line scale are configured to allow the system to process at least about 36,000 mail pieces per hour.

13. The permit mail preparation system of claim 12, wherein the applicator comprises a printer, positioned along transport path, for printing permit indicia directly to the respective mail pieces.

14. The permit mail preparation system of claim 12, wherein:

the applicator comprises a label applicator, coupled to the controller, and the label applicator is configured to receive signals from the controller directing the label applicator to apply a label containing a postal permit to each of the respective mail pieces as it travels along the transport path.

15. The permit mail preparation system of claim 14, wherein each label contains a pre-printed postal permit.

16. The permit mail preparation system of claim 14, further comprising a printer responsive to the controller for printing a postal permit on each label before the applicator applies each label to one of the respective mail pieces.

17. The permit mail preparation system of claim 12, further comprising:

a verifier, positioned downstream of the applicator along the transport path, for verifying whether or not the postal permit applied to each of the respective mail pieces is acceptable and supplying verification data to the controller, wherein, in response to the verification data, the controller generates the postal report for certification of permit mailing so that the certified data regarding mail pieces on which a permit has been applied indicates the number of the respective mail pieces on which an acceptable permit has been applied.

18. The permit mail preparation system of claim 12, further comprising:

mail sorting equipment positioned to receive and sort mail pieces on which a postal permit has been applied, received from the mail transport path, wherein:

the controller is further for sending signals to the mail sorting equipment to sort the mail pieces based on address information, and the mail sorting equipment also is configured to process at least about 36,000 mail pieces per hour.

19. A method of generating a report for certification of a permit mailing, comprising:

compiling data regarding application of a postal permit on a plurality of respective mail pieces processed through a permit mail processing system;

receiving information from an in-line scale of the permit mail processing system about measured weight of each of the respective mail pieces processed through the permit mail processing system; and processing the compiled data and the received information to generate a postal report for a permit mailing, for a postal authority that will receive and handle the permit mailing, the report including verification data regarding:

(1) mail pieces on which a permit has been applied, and (2) number of mail pieces processed of one or more measured weights, based on the information from the in-line scale.

20. A permit report, produced by the method of claim 19.

21. The method of claim 19, wherein the compiling of data regarding application of a postal permit is based at least in part on instructions sent to an applicator instructing the applicator to apply a postal permit to each of respective mail pieces processed through the permit mail processing system.

22. The method of claim 19, wherein the compiling of data regarding application of a postal permit is based at least in part on data received from a verifier positioned to scan each of the respective mail pieces processed through the permit mail processing system, the data from the verifier indicating whether or not a postal permit applied to each of the respective mail pieces is acceptable.

* * * * *